Sept. 21, 1965   W. LIMBERGER   3,207,129
COPYING DEVICE
Filed April 17, 1962

INVENTOR
WALTER LIMBERGER

AGENT

United States Patent Office 3,207,129
Patented Sept. 21, 1965

3,207,129
COPYING DEVICE
Walter Limberger, Alte Landstrasse 248, Hamburg, Germany
Filed Apr. 17, 1962, Ser. No. 188,224
5 Claims. (Cl. 118—637)

My present invention relates to an apparatus for making prints from a master copy by the deposition of toner particles upon acceptor regions of the print by a xerographic process as disclosed in my copending application Ser. No. 782,988, filed Nov. 20, 1958, now Patent No. 3,081,677.

My copending application discloses and claims an improved device of the type which duplicates a master image on a flexible sheet by placing this sheet in contact with a second sheet, provided with an electrostatically charged xerographic or photoconductive layer, and illuminating the two sheets so as to form a latent electrostatic reproduction of the master on the xerographic layer. The latent image can then be developed by dusting the exposed xerographic layer with toner particles and fixing the latter by fusion. In the copending application, I have set forth an apparatus which may be designed for use as a table-model reproducing machine wherein a substantially planar transport path for a flexible sheet provided with a xerographic layer is established between the outlet of an illuminating or exposing enclosure and the fusion or fixing enclosure of the housing. Thus, the sheet travels along a straight line through the developing enclosure wherein magnetic toner particles are deposited upon the sheet to develop the latent image formed by exposure of the photoconductive layer through the master copy.

My present invention relates to the developing means for depositing toner particles upon the sheet. Thus, it is an object of this invention to provide rapidly operating and effective means for sweeping toner particles across a xerographic layer without the need for depositing free masses of particles thereon.

According to a feature of the present invention, I provide an apparatus of the character described with a magnetic array displaceable across the transport path of the xerographic sheet in a direction transverse to its displacement and means for supplying tufts of toner particles to the magnets of this array whereby they may sweep the layer and deposit some of the particles on appropriate regions of the sheet. Advantageously, the magnetic array includes an endless band disposed above the xerographic layer and guided at opposite ends of the path around drums which are rotatable about axes perpendicular to the sheet. The array is preferably constituted by a plurality of bar magnets also extending perpendicular to the xerographic layer while being distributed along the band with respective poles closely spaced from the layer surface.

The above and other objects, features and advantages of my invention will become more readily apparent from the following description, reference being made to the accompanying drawing in which.

Figure 1:
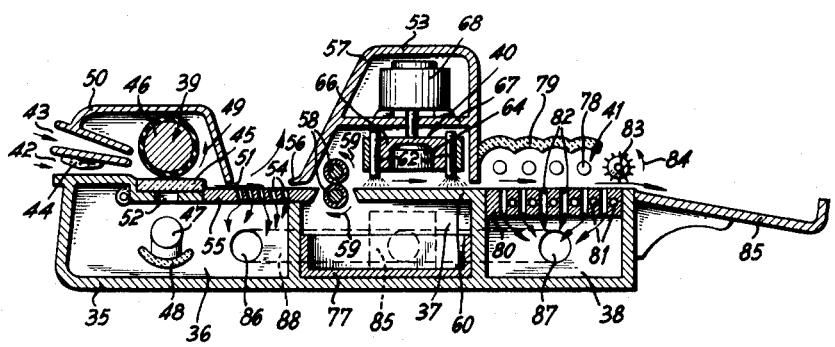
FIG. 1 is a side view, in section, of a reproducing apparatus according to the invention.

The reproducing apparatus shown in the drawing comprises a lower housing portion 35 subdivided into three chamber 36, 37 and 38 which are separated from one another by vertical partitions. A guide path for the xerographic sheet is provided along the upper surface of housing portion 35. Chamber 36 of the latter encloses part of an exposing unit, generally designated 39, while chambers 37 and 38 form, respectively, part of the enclosures for the developing and fixing units 40, 41. Extensions 50, 53 of the exposing and developing enclosures surround the parts of the apparatus lying above the guide path.

The exposing enclosure 36, 50 is formed with a pair of inlet slots 42, 43 at the front end of the apparatus. A forming device 44 is disposed along the upper edge of slot 42 and, as illustrated, may comprise a three-electrode charging unit which imparts an electrostatic charge to the xerographic layer of the copy sheet passing therebelow. While it is of course also possible to provide any other type of forming device, the three wire electrodes disclosed are advantageous in that they help press the paper against the bottom onto a plate 90 of the guide slot 42. This plate constitutes the counterelectrode for the forming device.

Within the exposing enclosure I provide a glass plate 45 which covers a window 52 above the lower housing portion 36 and forms part of the guiding path. A feed roller 46 in housing extension 50 is provided with a resilient, preferably rubber, sheath and bears upon the master and xerographic sheets which are respectively inserted through slots 43 and 42. An elongated light source 47 is disposed forwardly of a reflector 48 below the window 52. Roller 46, rotated by conventional motor means (not shown) in the direction of arrow 49, effects the simultaneous advance of the copy and master sheets through the illuminating unit 39 toward the developing unit.

Housing extension 50 terminates behind the roller 46 in a steeply inclined wall which forms with a support plate 55 of the guide path a narrow gap 51 through which the xerographic copy sheet and the master may pass. Plate 55 extends into housing portion 53 containing the developing unit 40. The plate 55 is formed with perforations 54 which are inclined upwardly in a direction opposite that of the advance of the sheets and communicate with the lower housing portion 36 from which air may be aspirated via conduit 86. The latter is connected to the suction side of a blower 89 so that the xerographic sheet is held down by the partial vacuum prevailing at the apertures 54 of plate 55 while the sheets are displaced along the guide path. The vacuum does not, however, act upon the master lying above the copy sheet so that the master can be readily removed from contact with the support in the space between the upper housing extensions 50, 53. Automatically operating separate devices may, of course, be provided for effecting the removal of the master along this portion of the guide path. Preferably, the separation of the master from the copy sheet is facilitated by a rearwardly extending edge 56 provided on the inclined forward wall 57 of housing extension 53 so that the exposed xerographic sheet is continuously covered during its passage through the space between the housing extensions.

Figure 2:
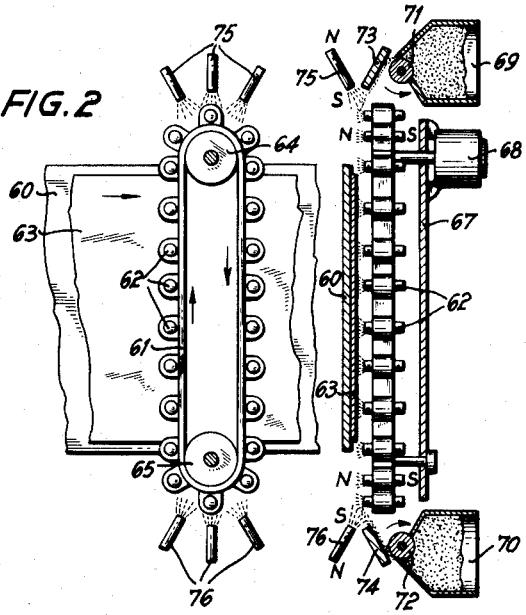
FIG. 2 is a plan view of the developing means thereof.
Figure 3:
FIG. 3 is a front view of the magnetic array partly shown in section.

Within housing extension 53 there are provided a pair of feed rollers 58, rotatable about respective axes parallel to the substantially straight guide path and resiliently urged toward each other by means not shown. The rollers are rotatable in the direction of arrow 59 and preferably have a rubber coating to prevent abrasion of the xerographic sheet. The distance between pressure roller 46 and the pair of feed rollers 58 is smaller than the normal length of the copies to be prepared so that the forward edge of the copy sheet is gripped by the rollers 58 before the sheet is released by the pressure roller 46. Forwardly of the feed rollers 58 in the direction of sheet travel the guide path comprises a plate 60 above which the developing unit 40 is disposed. This unit, also shown in FIGS. 2 and 3, comprises an endless conveyor belt 61 which is carried by drums 64, 65 flanking the guide path while being rotatable by a motor 68 about respective axes perpendicular to this path. The belt 61 carries a plurality of spaced mutually parallel bar magnets so arranged that like poles face the xerographic layer of the sheet passing over plate 60. The magnets may be bonded to the conveyor belt 61, which is preferably made of rubber, by vulcanization. To insure a positive drive of the belt by motor 68 the belt may be provided with projections which engage grooves in the drums 64, 65 or, alternately, the latter may be provided with formations engageable in recesses in the belt. The belt is also provided with strips such as those shown at 66 which extend transversely to the axes of the drums and engage recesses formed along the upper ends thereof to avoid downward slippage of the belt. The drums 64, 65 are carried by a horizontal partition 67 of the housing extension 53 which also serves to support the motor 68 and, if required, a reduction gear coupling the motor with the drums. As shown, only the drum 64 is rotated, drum 65 being merely journaled in partition 67.

Positioned laterally of the partition 67 in housing extension 53 are upwardly open containers 69, 70 serving as reservoirs for the magnetic toner particles. Containers 69 and 70 are funnel-shaped and converge downwardly toward respective outlets in which distirbuting rollers 71, 72 are positioned. These rollers may be driven with variable angular velocities so that the amounts of developer respectively dispensed from the containers 69 and 70 can be individually controlled. Beneath the rollers 71, 72 I provide chutes 73, 74 which are inclined toward the magnetic array 61, 62 and direct the developer particles dispensed by rollers 71, 72 toward the effective poles of magnets 62, i.e. their poles proximal to the guide path. In the region of the chutes 73, 74 a plurality of orienting magnets 75, 76 are so positioned that they have poles juxtaposed with the effective poles of magnet 62 but of opposite polarity thereto. Advantageously, the orienting magnets are bar magnets inclined to the axes of the magnet 62 whereby the magnetic field below the lower or effective poles of the latter is increased. Magnets 75, 76 have the function of directing toward the effective poles of magnet 62 brush-shaped bundles or tufts of developer particles which were deformed upon the sweeping of the tufts across the sheet surface. This reorientation of the tufts is repeated before each traversal of the guide path by the magnets 62. The described arrangement of magnets 75, 76 and the toner-distributing devices also has the advantage that tufts of particles are formed on the poles of the fixed orienting magnets juxtaposed with the operating magnets, these stationary tufts coming into direct contact with the moving tufts of the operating magnet so that an extensive renewal of the developer particles on the magnets 62 is always insured.

After the bundles are once formed on the operating magnets 62 and the orienting magnets 75, 76, it is sufficient merely to supply toner which is added to the tufts from the containers 69, 70 at substantially the rate at which toner is consumed during the wiping of the photoconductive layer.

The distributing magnets 62 and the orienting magnets 75, 76 are, advantageously, of equal strength and the developer is directed by the chutes 73, 74 toward a location intermediate the confronting poles of the distributing and orienting magnets. It is also possible to make the orienting magnets 75, 76 somewhat weaker than the distributing magnets and/or to arrange the chutes 73, 74 so that the developer is guided more closely to the poles of the distributing magnets than to those of the orienting magnets.

In chamber 37 of the housing below the developing means 40 in housing extension 53 I provide a removable receptacle 77 which serves to catch developer particles falling from the xerographic sheet or from the magnets 62, 75, 76. The developer particles collected in this receptacle can be returned to the supply reservoirs 69, 70 after having been enriched, if required, by the addition of toner.

The fixing section 41 located further along the guide path comprises a plurality of heating elements 78 arrayed across the guide path. The latter is, in this region, formed by a perforated plate 80. A hood 79 partially encloses the fixing unit and is formed as a reflector for the infra-red emitters 78. Plate 80 is provided with additional heating elements 81 which effect the heating of the sheet from its reverse side. The plate closes the lower housing chamber 38 in which a source of reduced pressure, indicated as a conduit 87, is connected so that the copy sheet is drawn against the plate. Moreover, the partial vacuum acting through the apertures 82 extracts from the fixing enclosure the fumes which arise in fusing the toner into the sheet. These fumes would impair the operation of the apparatus if they were permitted to spread through the unit. The blower 89, whose suction side is connected to the conduits 86, 87 via manifold 88, is positioned at one side of the housing base 35.

A pin roller 83 is disposed at the outlet end of the fixing unit 41 and is driven counterclockwise (arrow 84) while extending over the entire length of the exit slot. The roller thus forms a cover for the slot while constituting a feeding device which draws the sheets past the heating elements 78, 81 and disposes them upon a platform 85 arranged at the rear of the apparatus.

The invention described and illustrated is believed to admit of many modifications and variations within the ability of persons skilled in the art, all such modifications and variations being deemed included within the spirit and scope of the appended claims.

I claim:

1. Apparatus for the development of a latent electrostatic image on a sheet provided with a xerographic layer, comprising guide means forming a substantially horizontal transport path; feed means for displacing said sheet along said path; distributing means including endless conveyor means carrying an array of permanent magnets spacedly positioned above said path while extending substantially horizontally thereacross; supply means positioned laterally beyond said path for delivering magnetic toner particles to said array; actuating means for displacing said conveyor means in a substantially horizontal plane across said path transversely to the direction of displacement of said sheet in a manner causing magnetically coherent tufts of said particles to sweep the surface of said sheet, and at least one further magnet fixedly positioned alongside said array in the region of said supply means for orienting said tufts of particles in a direction substantially perpendicular to the motion of said permanent magnets.

2. Apparatus as defined in claim 1 wherein said permanent magnets are bar magnets disposed substantially vertically with like poles similarly oriented and wherein said further magnet has a pole juxtaposable with the lower poles of said array and of a polarity opposite thereto.

3. Apparatus as defined in claim 2 wherein said further magnet is positioned below said lower poles.

4. Apparatus as defined in claim 3 wherein said supply means further comprises dispensing means for directing a stream of said toner particles between said pole of said further magnet and said lower poles, thereby forming a tuft of said particles on said further magnet adapted to intercept tufts of said particles on the magnets of said array upon displacement of said conveyor means.

5. Apparatus as defined in claim 4 wherein said dispensing means includes a container for said particles having an outlet above said further magnet, and a rotating roller received in said outlet for controlling the rate at which said particles are fed to said further magnet.

References Cited by the Examiner

UNITED STATES PATENTS

| | | | |
|---|---|---|---|
| 2,221,776 | 11/40 | Carlson | 95—1.7 X |
| 2,786,441 | 3/57 | Young | 118—637 |
| 2,851,988 | 9/58 | Reuter | 118—637 |
| 2,854,947 | 10/58 | Giaimo | 95—1.7 X |
| 2,892,445 | 6/59 | Giaimo | 118—637 |

EVON C. BLUNK, *Primary Examiner.*